US012129850B2

(12) United States Patent
Marien et al.

(10) Patent No.: US 12,129,850 B2
(45) Date of Patent: Oct. 29, 2024

(54) SCREW ROTOR AND METHOD FOR MANUFACTURING SUCH SCREW ROTOR

(71) Applicant: ATLAS COPCO AIRPOWER, NAAMLOZE VENNOOTSCHAP, Wilrijk (BE)

(72) Inventors: Karen Anna Leon Marien, Wilrijk (BE); Peter Michel, Halle (DE); Patrick Hirsch, Halle (DE)

(73) Assignee: ATLAS COPCO AIRPOWER, NAAMLOZE VENNOOTSCHAP, Wilrijk (BE)

( * ) Notice: Subject to any disclaimer, the term of this patent is extended or adjusted under 35 U.S.C. 154(b) by 338 days.

(21) Appl. No.: 17/428,661

(22) PCT Filed: Feb. 4, 2020

(86) PCT No.: PCT/IB2020/050861
§ 371 (c)(1),
(2) Date: Aug. 5, 2021

(87) PCT Pub. No.: WO2020/165689
PCT Pub. Date: Aug. 20, 2020

(65) Prior Publication Data
US 2022/0128054 A1 Apr. 28, 2022

(30) Foreign Application Priority Data
Feb. 12, 2019 (BE) .................... 2019/5087

(51) Int. Cl.
*F04C 18/16* (2006.01)
*B29C 45/14* (2006.01)
(Continued)

(52) U.S. Cl.
CPC .............. *F04C 18/16* (2013.01); *F04C 29/00* (2013.01); *B29C 45/14336* (2013.01);
(Continued)

(58) Field of Classification Search
CPC .......... B29C 45/14336; B29K 2063/00; B29K 2067/00; B29K 2071/00; B29K 2077/00;
(Continued)

(56) References Cited

U.S. PATENT DOCUMENTS 3,918,838 A * 11/1975 Moody, Jr. ............ F04C 18/084
418/152
2009/0087563 A1 * 4/2009 Voegele .................. F04C 2/084
74/462

(Continued)

FOREIGN PATENT DOCUMENTS

CN 104220757 A 12/2014
CN 208311036 U 1/2019
(Continued)

OTHER PUBLICATIONS

JP Decision for Final Rejection in corresponding JP Application No. 2021-547067, dated Jan. 25, 2023.
(Continued)

*Primary Examiner* — Dapinder Singh
(74) *Attorney, Agent, or Firm* — BACON & THOMAS, PLLC

(57) ABSTRACT

A screw rotor is made out of polymer. The screw rotor includes a shaft with a rotor body on it. The polymer of the shaft is reinforced with fibers. The shaft features elements that engage the rotor body or corresponding elements on the rotor body, such that the elements prevent an axial and/or rotational movement of the shaft with respect to the rotor body.

20 Claims, 3 Drawing Sheets

(51) Int. Cl.
  *F04C 9/00* (2006.01)
  *F04C 29/00* (2006.01)
  *B29K 63/00* (2006.01)
  *B29K 67/00* (2006.01)
  *B29K 71/00* (2006.01)
  *B29K 77/00* (2006.01)
  *B29K 79/00* (2006.01)
  *B29K 277/00* (2006.01)
  *B29K 307/04* (2006.01)
  *B29K 309/08* (2006.01)
  *B29L 1/00* (2006.01)

(52) U.S. Cl.
  CPC ...... *B29K 2063/00* (2013.01); *B29K 2067/00* (2013.01); *B29K 2071/00* (2013.01); *B29K 2077/00* (2013.01); *B29K 2079/08* (2013.01); *B29K 2277/10* (2013.01); *B29K 2307/04* (2013.01); *B29K 2309/08* (2013.01); *B29L 2001/007* (2013.01)

(58) Field of Classification Search
  CPC ............ B29K 2079/08; B29K 2277/10; B29K 2307/04; B29K 2309/08; B29L 2001/007; F01C 1/084; F01C 1/107; F01C 1/16; F01C 21/08; F04C 2/084; F04C 18/084; F04C 18/107; F04C 18/16; F04C 29/00; F04C 29/0078; F04C 2230/21; F04C 2240/60; F05C 2203/0808; F05C 2225/00; F05C 2225/06; F05C 2225/10; F05C 2225/12; F05C 2251/04; F05C 2253/04; F16C 2360/43
  See application file for complete search history.

(56) References Cited

U.S. PATENT DOCUMENTS

| | | | |
|---|---|---|---|
| 2013/0183185 | A1 | 7/2013 | Dirscherl |
| 2017/0298733 | A1* | 10/2017 | Williams ................ B29C 70/86 |

FOREIGN PATENT DOCUMENTS

| | | |
|---|---|---|
| JP | S50118309 A | 9/1975 |
| JP | S63203310 A | 8/1988 |
| JP | H1301976 A | 12/1989 |
| JP | H0227180 A | 1/1990 |
| JP | H02276612 A | 11/1990 |
| JP | H510282 A | 1/1993 |
| JP | H06123292 A | 5/1994 |
| JP | 2002147256 A | 5/2002 |
| JP | 2003314086 A | 11/2003 |
| JP | 2008106740 A | 5/2008 |
| JP | 09-264323 A | 11/2008 |
| JP | 2013044298 A | 3/2013 |
| JP | 2017024388 A | 2/2017 |
| JP | 6463867 B1 | 2/2019 |
| WO | WO 1989/09881 A1 | 10/1989 |
| WO | 2011092674 A1 | 8/2011 |
| WO | WO 2013/126969 A1 | 9/2013 |
| WO | 2015138557 A1 | 9/2015 |

OTHER PUBLICATIONS

International Search Report and Written Opinion in corresponding PCT Application No. PCT/IB2020/050861, dated Mar. 19, 2020.
CN Office Action and Search Report in corresponding CN Application No. 202010087634.0, dated Jan. 20, 2023.

* cited by examiner

SCREW ROTOR AND METHOD FOR MANUFACTURING SUCH SCREW ROTOR

The present invention relates to a screw rotor.

More specifically, the screw rotor according to the invention is meant for fluid-injected compressors, expanders, and vacuum pumps.

BACKGROUND OF THE INVENTION

It is known that such screw rotors are traditionally manufactured from cast iron or steel, cast in a crude screw form or forged in a crude cylindrical form, which is then finished by way of coarse and fine grinding, filing, milling, and other cutting operations of the shaft as well as of the body of the screw rotor (with the screw profile) and its final finished screw form is obtained.

This finish is necessary because the casting process does not allow for obtaining a form within the very fine tolerances that are necessary for allowing the final machine to function properly.

Even though such conventional screw rotors function properly, the finishing by means of grinding, filing, milling and other such processes is very labor- and time-intensive.

Moreover, all this causes the cost to be driven up.

Another disadvantage is that much material is machined away during the finishing process, which constitutes a loss or a waste of raw materials.

Another disadvantage is the weight of such conventional screw rotors due to the use of cast iron or steel.

The task of the present invention is to offer a solution to at least one of the aforementioned and other disadvantages.

SUMMARY OF THE INVENTION

The subject of the present invention is a screw rotor, characterized in that the screw rotor is made from a polymer, wherein the screw rotor consists of a shaft with a rotor body on it, wherein the polymer of the shaft is reinforced with fibers, wherein the shaft features elements that engage the rotor body or corresponding elements in the rotor body, such that the elements prevent an axial and/or rotational movement of the shaft with respect to the rotor body.

By using a polymer, the screw rotor will not only be lighter than the traditional conventional metal screw rotors; it will furthermore be more resistant to corrosion, and it is easier to manufacture in complex forms.

Such a screw rotor may, for instance, be made by means of an injection molding process, which allows for the manufacturing of a rough screw shape that already closely approximates the final finished screw shape, such that finishing it by means of the cutting operations needed to bring this rough screw within the required tolerances will be of a much more limited scope, or possibly not be necessary at all.

Moreover, the processing of the composite screw rotor is much simpler and easier than processing a cast iron or steel screw rotor.

This implies that much less work and time are needed for the finishing process, which will bring about considerable savings in cost.

Furthermore, less material will be lost, because the point of departure will be a crude screw form that already closely approximates the final form.

Even though for the invention, it is only necessary that polymer reinforced with fibers be used for the shaft, it is not excluded that the rotor body be manufactured from a fiber-reinforced polymer as well.

The elements of the shaft are deviations of the shaft into or from its surface, meaning deviations towards the center line of the shaft or away from the center line of the shaft.

The elements of the shaft and the corresponding or matching elements on or in the rotor body will cause a mechanical blockage between the shaft and the rotor body, as a result of which axial forces and torque may be transmitted from the shaft to the rotor body, and vice versa. Even though the elements may be arranged on the shaft itself, it is also possible for the elements of the shaft to be formed by means of an intermediate body or a key, arranged on the shaft in a designated recess.

Preferably, the fibers in the shaft extend primarily in the axial direction. This will provide the shaft with the necessary rigidity and strength.

It is known that in screw rotors in a screw compressor, for instance, very strong axial forces and gas forces are exerted on the screw rotor, for which reason it is crucially important for the shaft to have the necessary rigidity.

It is possible for the rotor body to consist of two or more concentric layers, wherein an inner layer features elements engaging the following layer, such that the elements prevent an axial and/or rotational movement of the one layer relative to the following layer.

This will be used in particular for manufacturing larger screw rotors by means of injection molding, such that the maximum thickness of each layer is eight millimeters.

By injection molding the rotor body in multiple steps or stages, the volume of the material added in each step or stage can be limited, allowing for an easier monitoring of the injection molding process and the subsequent cooling process. This will help optimize the final mechanical properties of the screw rotor. The elements are analogous to, and have the same function as, the aforementioned elements of the shaft.

The invention also has a method as its subject, for manufacturing a screw rotor consisting of a shaft and a rotor body, characterized in that the screw rotor is made from a polymer and in that the method comprises the following steps:

A) providing a shaft;
B) the injection molding of the rotor body using a designated mould, wherein the aforementioned shaft is used as an insert into the mould.

By executing the process in at least two steps, the injection molding process of step B will be much easier as compared to an injection molding process in which the screw rotor is injection molded in a single step, among other things in terms of the shrinking of the material, the dimensions, and the mechanical properties, which are easier to monitor in a multistage process such as according to the invention.

Another advantage is that by using the shaft as an insert in the mould of the rotor body, the rotor body is cast onto or around the shaft, as a result of which the casting of the rotor body generates a thermal bond between the shaft and the rotor body.

This will ensure that the shaft cannot move relative to the rotor body, since with the injection molding of the rotor body, the surface of the shaft will heat up again due to its contact with the hot molten fiber-reinforced polymer that is injected into the mould, thus allowing it to create a thermal bond with the material of the rotor body that is cast around it.

BRIEF DESCRIPTION OF THE DRAWINGS

With the understanding to better demonstrate the features of the invention, in the following, without these descriptions having any restrictive character, some examples of preferred variants are described of a method according to the invention for manufacturing a screw rotor, with reference to the enclosed drawings, in which.

DETAILED DESCRIPTION OF THE INVENTION

Figure 1:
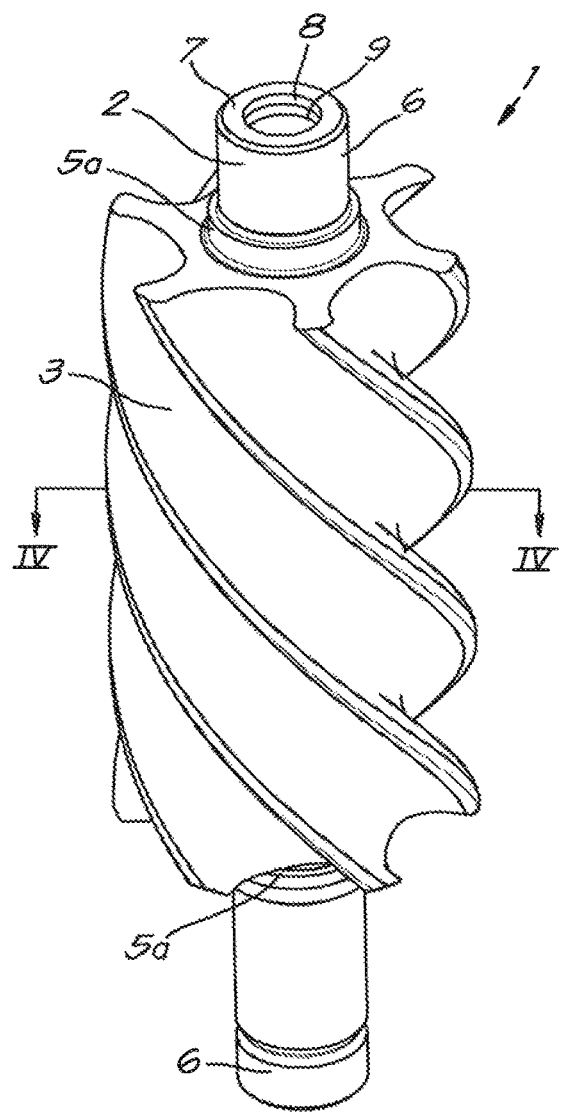
FIG. 1 shows a schematic and perspective view of a possible embodiment of a screw rotor according to the invention.

The screw rotor 1 according to the invention schematically shown in FIG. 1 consists of a shaft 2 with a rotor body 3 on it.

The screw rotor 1 may be used in a fluid-injected compressor, expander, or vacuum pump.

In the example shown, the rotor body 3 is cylindrical in form. However, it is not excluded that the rotor body 3 have a conical form. Using a conical rotor has the advantage that the forces are better distributed, and that the compression can be increased.

Figure 2:
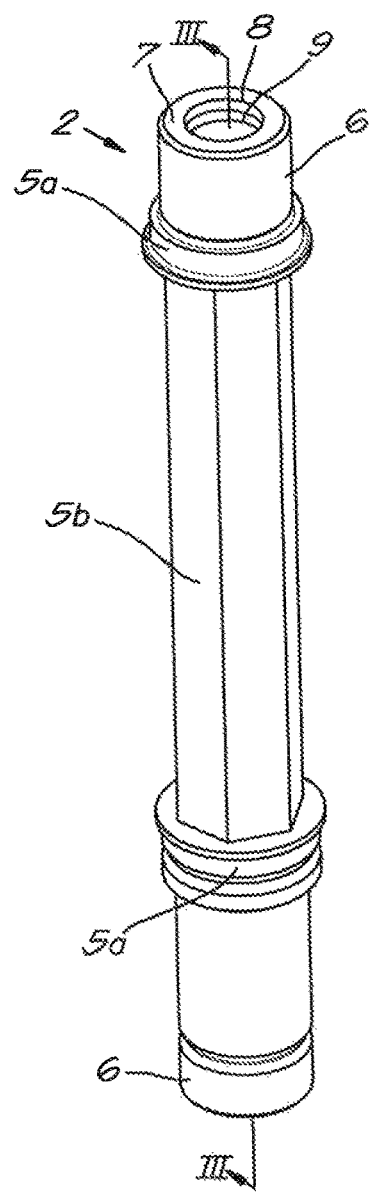
FIG. 2 shows the shaft of the screw rotor of FIG. 1.

In FIG. 2, the shaft 2 is shown separately.

According to the invention, the screw rotor 1 is made out of a polymer.

In this case, for the invention, at least the shaft 2 is made out of a polymer reinforced with fibers 4, and the rotor body 3 may be made out of a polymer without fibers 4, but in the example shown here and described below, the rotor body 3 is made out of a polymer reinforced with fibers 4 as well.

The polymer may be a polyamide, for instance, or a polyimide. However, the invention is not limited to these. For instance, the polymer may also be polyether ether ketone (PEEK).

Possibly, the polymer may also be a thermo-setting polymer, for instance an epoxy, a vinyl ester, or an unsaturated polyester.

The fibers 4 preferably, but not necessarily, comprise carbon fibers or glass fibers. The fibers may also comprise an organic polymer such as aramid fibers, for instance. Carbon nanotubes are a possibility as well.

In a possible embodiment, the polymer reinforced with fibers 4 is a so-called self-reinforced polymer, in which the fibers are made out of the same polymer as the mould.

Preferably, it is polymer polyamide, polyimide, or PEEK reinforced with between 10 and 60 percent of fibers 4 by weight. Preferably, the weight percentage of the fibers is between 25 and 45 percent.

It is not excluded that the shaft 2 is made from a different polymer than the rotor body 3, wherein the rotor body 3 may be made out of a polymer that may or may not be reinforced with fibers 4.

Thus, for instance, the polymer reinforced with fibers 4 of the shaft 2 may have an identical or a higher softening temperature than the polymer reinforced with fibers 4 of the rotor body 3.

The difference in the softening temperature of different layers preferably varies between zero and twenty degrees Celsius.

This will lead to benefits in particular in terms of the production or manufacturing of the screw rotor 1, as will be clarified below.

In this case, without this being necessary for the invention, the fibers 4 in the shaft 2 extend primarily in the axial direction X-X'.

Figure 3:
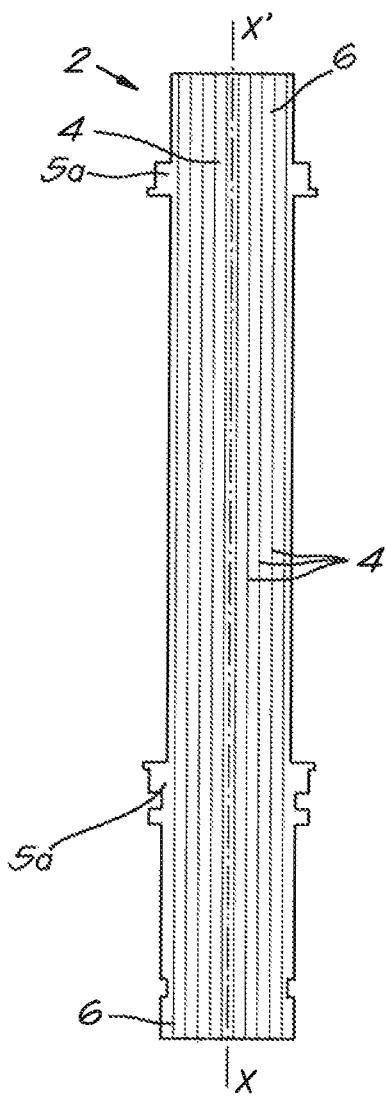
FIG. 3 schematically shows a cross section along the line III-III in FIG. 2.

This is shown schematically in the cross section in FIG. 3.

Due to this orientation of the fibers 4, the shaft 2 will have the necessary rigidity. It is well known that during the operation of the machine, the shaft 2 is exposed to strong axial forces and gas forces at the location where the screw rotor 1 is mounted.

As can be seen in FIG. 3, the shaft 2 is a full shaft 2. It is not excluded that the shaft 2 is hollow, meaning that there a longitudinal cavity extends through the shaft 2. This will prevent so-called flow problems in the production of the shaft 2.

In this case, but not necessarily, the fibers 4 in the rotor body 3 are oriented arbitrarily or randomly.

Figure 4:
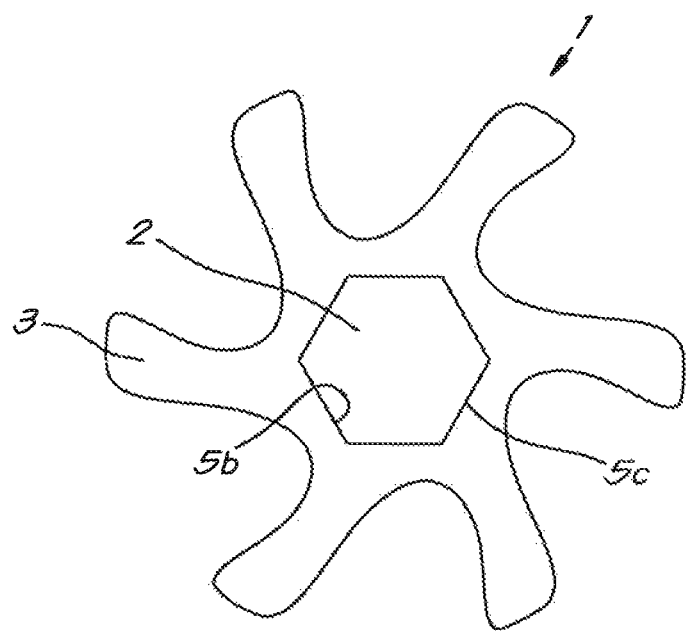
FIG. 4 schematically shows a cross section along the line IV-IV in FIG. 1.

According to the invention, and as can be seen clearly in FIGS. 2, 3, and 4, the shaft 2 features elements 5a, 5b.

Some of these elements 5a may engage the rotor body 3, some of these elements 5b may engage corresponding elements 5c in the rotor body 3, all this being designed such that the elements 5a, 5b, 5c prevent an axial and/or a rotational movement of the shaft 2 relative to the rotor body 3.

This will be explained via the figures.

As can be seen in FIGS. 2 and 3, the shaft 2 features two elements 5a in the form of an ring shaped protrusion, wherein the projection onto the shaft 2 according to the axial direction X-X' is cyclically symmetrical and coaxial with the center line X-X' of the shaft 2.

Cyclically symmetrical means: sections or segments that repeat rotationally around the center line.

Even though these elements 5a pertain in this case to a ring shaped protrusion, these elements 5a may also comprise a differently shaped protrusion, groove, or ring.

These elements 5a may engage the rotor body 3 itself, as shown in FIG. 1.

Such elements 5a will be able to transmit axial forces from the shaft 2 to the rotor body 3, and vice versa.

Effectively, they constitute a stop for the rotor body 3 on the shaft 2 and vice versa, such that when an axial force is exerted onto the rotor body 3, it can be transmitted via this stop to the shaft 2.

It is not excluded that these elements 5a are arranged at a different location, farther away from the end 6 of the shaft 2. In that case, these elements 5a will not engage the rotor body 3 itself, but corresponding elements 5c of the rotor body 3.

Furthermore, the shaft 2 also features a number of elements 5b that may engage corresponding elements 5c of the rotor body 3.

In that case, these elements 5b pertain to protrusions along the axial direction X-X' of the shaft 2, which cause the cross section of the shaft 2 to be hexagonal.

These elements 5b are located at a place on the shaft 2 above which the rotor body 3 is arranged, such as follows from the comparisons of FIGS. 1 and 2.

As can be seen in FIG. 4, the rotor body 3 features corresponding elements 5c, which engage the elements 5b of the shaft 2.

Via such elements 5*b*, 5*c* the torque may be transmitted from the shaft 2 to the rotor body 3. This will be relevant in particular for the driving of the screw rotor 1 by a motor via the shaft 2.

Instead of protrusions extending in the axial direction X-X', a groove, ring, or similar may be used by way of elements 5*b*, 5*c* as well.

As can be seen in FIGS. 1 and 2, in this case, the shaft 2 is featured at its face 7 a coupling piece 8, which features a screw thread 9 in which a bolt can be arranged.

By means of this bolt, the shaft 2 may be connected to a drive shaft of a motor, for instance, or something similar.

Even though in the example shown, the screw rotor 1 consists of a shaft 2 with a rotor body 3, it is not excluded that the rotor body 3 itself consist of two or more concentric layers, wherein an inner layer features elements 5*b*, 5*c* engaging the following layer, such that the elements 5*b*, 5*c* prevent an axial and/or rotational movement of the one layer relative to the following layer.

In other words, the principle is very similar in nature to the principle of the shaft 2 and the rotor body 3 as explained above.

In the case of a large screw rotor 1, this will be advantageous in particular during the production process, as will be explained below.

The screw rotor of FIGS. 1 through 4 can be manufactured according to a method according to the invention.

The method for producing the screw rotor 1, made out of a polymer reinforced with fibers 4, by way of injection molding, essentially comprises two steps:
A) providing a shaft;
B) the injection molding of the rotor body 3 using a designated mould, wherein the aforementioned shaft 2 is used as an insert into the mould.

Preferably, but not necessarily, the aforementioned step A comprises the injection molding of the shaft 2 of the screw rotor 1, using a designated mould.

This is not necessary for the invention, however. The shaft 2 may also be extruded, for instance.

In step A, for the injection molding of the shaft 2, a mould will be used here with elements 5*a*, 5*b*, such that the aforementioned elements 5*a*, 5*b* are created on the shaft 2.

In order to ensure that the fibers 4 extend in the axial direction X-X', the polymer reinforced with fibers 4 may be injected into the mould in the axial direction X-X'.

By then using the shaft 2 as an insert in the mould of the rotor body 3, corresponding elements 5*c* will effectively be created automatically in the rotor body 3.

By using a different polymer reinforced with fibers 4 for the shaft 2 than the polymer reinforced with fibers 4 used for the rotor body 3, such that the polymer reinforced with fibers 4 used for the shaft 2 has an identical or a higher softening temperature than the polymer used for the rotor body 3, the shaft 2 as a whole will not melt or soften when the rotor body 3 is cast around it. This way, the mechanical properties of the shaft 2 remain intact, and the fibers 4 of the shaft 2 may be prevented from losing their orientation if the polymer of the shaft 2 were to soften somewhat.

It is not excluded for step B, the injection molding of the rotor body 3, to be executed in two or more steps, in each of which more material is added to the rotor body 3 through the use of successive matrices, wherein the rotor body part manufactured in the previous step is used as an insert in the following mould.

Thus, the rotor body 3 itself can be made out of two or more concentric layers, wherein the use of matrices with elements 5*c* may cause elements 5*c* to be provided on an inner layer to engage the following layer cast around it.

This approach is particularly advantageous with large screw rotors 1, because this may provide for the material added to be more limited with each step, so that the cooling can be monitored, such that no or much fewer mechanical tensions are created.

If the rotor body 3 has a conical form, this has the advantage that it can be demolded, i.e. removed from the mold, much more easily.

In order to insert the aforementioned coupling piece 8 into the face 7 of the shaft 2, the coupling piece 8 is arranged in the mould of the shaft 2 at the location of the respective face 7 of the shaft 2.

Thus, the coupling piece 8 can be integrated into the shaft 2 during the casting process.

Alternatively, after step B, the aforementioned coupling piece 8 may be arranged through self-tapping in a designated cavity in a face 7 of the shaft 2.

It should be clear that in the examples shown and described in FIGS. 1 through 5, only some possible examples of possible embodiments of elements 5*a*, 5*b* are shown.

Figure 5:
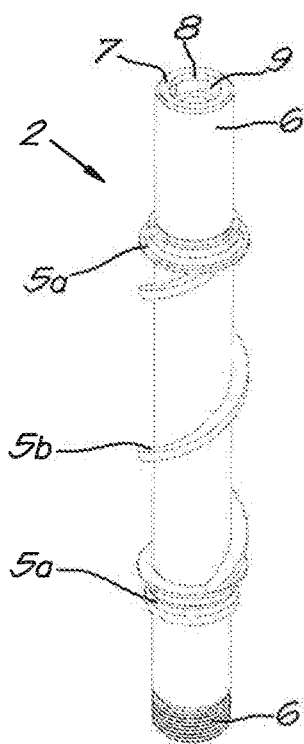
FIGS. 5 through 7 schematic show variant embodiments of FIG. 2.

Another possible embodiment is shown in FIG. 5, in which the elements 5*a*, 5*b* comprise at least one protrusion 5*b*, having the form of a helix or a spiral around the shaft 2.

Instead of a protrusion, this may also be a helix- or spiral-shaped groove.

The protrusion, or element 5*b*, is situated at a location of the shaft 2 above which the rotor body 3 is arranged, so that during the injection molding process, corresponding elements are formed in the rotor body 3.

The helix-shaped elements 5*b* will be able to transmit a combination of rotational as well as axial forces in order to prevent an axial and rotational movement of the shaft 2 relative to the rotor body 3.

Figure 6:
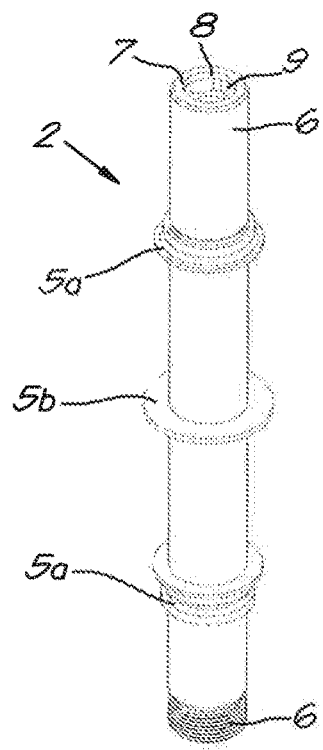

FIG. 6 shows an additional embodiment, wherein the shaft 2 features an element 5*b* that may engage a corresponding element 5*c* of the rotor body 3.

In this case, this element 5*b* is a ring shaped protrusion around the shaft 2.

This element 5*b* is situated at a location on the shaft 2 above which the rotor body 3 is arranged. This element 5*b* will be able to transmit axial forces from the shaft 2 to the rotor body 3, and vice versa.

Figure 7:
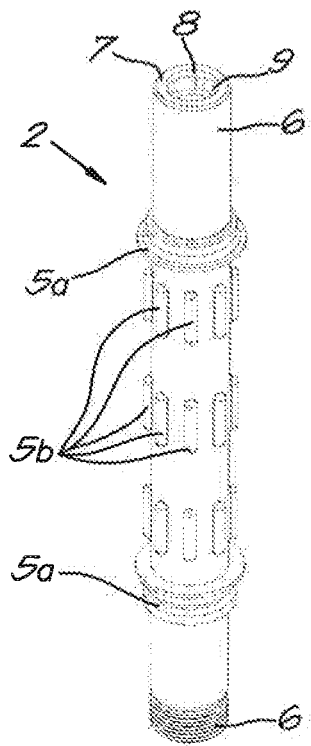

FIG. 7 shows yet another variation, wherein the shaft 2 features multiple elements 5*b* in the form of elongated protrusions that extend in the axial direction along the shaft 2 and are dispersed around the shaft 2.

Based on the aforementioned variants, it is clear that the elements 5*a*, 5*b* may be embodied in various manners, and that the examples shown are not restrictive in any way.

The present invention is in no way limited to the exemplary embodiments described and shown in the figures. Rather, a method and a screw rotor according to the invention may be realized in different variants without exceeding the scope of the invention.

The invention claimed is:

1. A method for manufacturing a screw rotor comprising a shaft and a rotor body, wherein the screw rotor is made out of a polymer, said method comprising the following steps:
   A) providing the shaft; and
   B) injection molding the rotor body using a designated mold, wherein the shaft is used as an insert into the mold,
   wherein the polymer of the shaft is reinforced with fibers, and wherein the shaft features elements that engage the rotor body or corresponding elements in the rotor body, such that the elements prevent an axial and/or rotational movement of the shaft with respect to the rotor body.

2. The method of claim 1, wherein the elements comprise at least one groove, ring, protrusion, or similar, wherein a projection on a surface perpendicular to the shaft in an axial direction is cyclically symmetrical and coaxial with a center line of the shaft.

3. The method of claim 1, wherein the elements comprise at least one groove, ring, protrusion, or similar extending in an axial direction, whereby this element is situated at a location on the shaft upon which the rotor body is arranged.

4. The method of claim 1, wherein the shape of the rotor body is cylindrical or conical.

5. The method of claim 1, wherein the shaft is hollow.

6. The method of claim 1, wherein the elements comprise at least one groove, protrusion, or similar, having the shape of a helix around the shaft.

7. The method of claim 1, wherein the fibers in the shaft primarily extend in an axial direction.

8. The method of claim 1, wherein the rotor body is at least partially made out of a polymer manufactured reinforced with fibers.

9. The method of claim 1, wherein the polymer is a thermo-setting polymer.

10. The method of claim 9, wherein the fibers in the rotor body are arbitrarily or randomly oriented.

11. The method of claim 1, wherein the polymer is a polyamide, a polyimide, or PEEK.

12. The method of claim 1, wherein the fibers comprise carbon fibers or glass fibers.

13. The method of claim 1, wherein the fibers comprise an organic polymer.

14. The method of claim 1, wherein the fibers made out of an organic polymer are aramid fibers.

15. The method of claim 1, wherein the polymer is a self-reinforced polymer of aramid fibers in an aramid polymer matrix.

16. The method of claim 1, wherein the shaft is made of a different polymer than the rotor body.

17. The method of claim 1, wherein the polymer of the shaft has an identical or higher softening temperature than the polymer of the rotor body.

18. The method of claim 1, wherein at the location of a face, the shaft features a coupling piece that features a screw thread in which a bolt can be arranged.

19. The method of claim 1, wherein the rotor body consists of two or more concentric layers, wherein an inner layer features elements engaging the following layer, such that the elements prevent an axial and/or rotational movement of the one layer relative to the following layer.

20. The method of claim 9, wherein the polymer is an epoxy, a vinyl ester or an unsaturated polyester.

* * * * *